United States Patent [19]

Oshima et al.

[11] Patent Number: 4,952,363
[45] Date of Patent: Aug. 28, 1990

[54] METHOD OF DRAWING FILM

[75] Inventors: Yoshitomo Oshima; Hideo Egami, both of Shizuoka, Japan

[73] Assignee: Fuji Photo Film Co., Ltd., Kanagawa, Japan

[21] Appl. No.: 382,929

[22] Filed: Jul. 21, 1989

[30] Foreign Application Priority Data

Aug. 11, 1988 [JP] Japan ................................ 63-198857

[51] Int. Cl.⁵ ............................................. B29C 55/06
[52] U.S. Cl. ..................................... 264/288.4; 26/71
[58] Field of Search ......................... 264/288.4, 290.2; 26/71

[56]  References Cited

U.S. PATENT DOCUMENTS 3,261,903  7/1966  Carr ................................... 264/290.2
4,384,392  5/1983  Allen .................................. 264/290.2

FOREIGN PATENT DOCUMENTS 39-2398  3/1964  Japan ................................ 264/290.2

Primary Examiner—James Lowe
Attorney, Agent, or Firm—Sughrue, Mion, Zinn, Macpeak & Seas

[57] ABSTRACT

In a method of drawing a film which comprises drawing the traveling film in the longitudinal direction between rolls and thereafter cooling the drawn film by a cooling roll, the improvement which comprises engaging both side ends or their vicinities of the film with the engaging portions formed on both ends or their vicinities of the cooling roll in the circumferential direction. In the film drawing method of the invention, the drawn film is contacted in a softening state with the cooling roll, and pressed on the surface of the cooling roll by the tension of the film. Thus, both sides of the film are deformed according to the shape of the engaging portions during cooling, and prevent the contraction of the film in the cross direction by the engagement.

10 Claims, 2 Drawing Sheets

METHOD OF DRAWING FILM

BACKGROUND OF THE INVENTION

1. Field of the Invention

This invention relates to a method of drawing a thermoplastic resin film in the longitudinal direction.

2. Description of the Prior Art

In general, in a process of drawing a film in the longitudinal direction, i.e. the traveling direction of the film, the film was heated up to a drawing temperature. Then, the film was drawn by passing through drawing rolls having a different rotation speed, and cooled to solidify it by passing through a cooling roll.

Incidentally, a strain was generated in the film in the cross direction by the stress acting in the longitudinal direction during the drawing process, and the film was contracted in the cross direction (the phenomenon is called neck-in.). The film was moved on the drawing rolls, and abrasions were generated. Moreover, the degree of the neck-in varied according to the drawing conditions, resulting unevenness in the film thickness and in the film properties.

Heretofore, various means have been developed in order to solve the above problem. For example, by cleaning the drawing rolls, the holding force of the drawing rolls is raised, and dust which causes scratches on the film is removed. As another means, the drawing rolls are made of a material having a great friction coefficient. Another means comprises nipping the whole width of the film by nip rolls. Another means comprises nipping both sides of the film by nip rolls on the drawing rolls during drawing of the film (Japanese Patent KOKAI No. 60-104313). Another means comprises providing linear projections projected to upper and lower directions on both sides of the film and fitting the projections to grooves formed on pass rolls to avoid the movement of the film in the cross direction (U.S. Pat. No. 3,429,961).

While neck-in occurred in the cooling process using the cooling roll, neck-in also occurred in the drawing process when drawing a film in the longitudinal direction. The film moved in the cross direction by contraction through cooling, and by the tension in the longitudinal direction due to the drawing of the film, and abrasions occurred on the surface of the film. This should be a serious problem, particularly when the film is used as the base of a microfilm requiring severe qualities. Nevertheless, this problem has been overlooked, and no means has been taken for avoiding the neck-in in the cooling process.

SUMMARY OF THE INVENTION

An object of the invention is to provide a method of drawing film wherein the occurrence of neck-in is avoided securely by a simple means in the cooling process after drawing.

When the aforementioned means developed for the drawing process is employed for the cooling process, then costly devices are needed. For example, when both sides of the film are nipped by nip rolls, then nip rolls are necessary. When linear projections are provided on both sides of the film, a special die and pass rolls are necessary. Sufficient quality for microfilm is not obtained by employing the other conventional manner.

The present inventors noticed the solidification of the film on the cooling roll, and have completed the method of the invention by which the above object has been achieved. The method of drawing a film of the invention comprises, in the method of drawing the traveling film in the longitudinal direction between rolls and thereafter the cooling roll, engaging both side ends of their vicinities of the film with the engaging portions formed on both ends or their vicinities of the cooling roll in the circumferential direction.

DETAILED DESCRIPTION OF THE INVENTION

Figure 1:
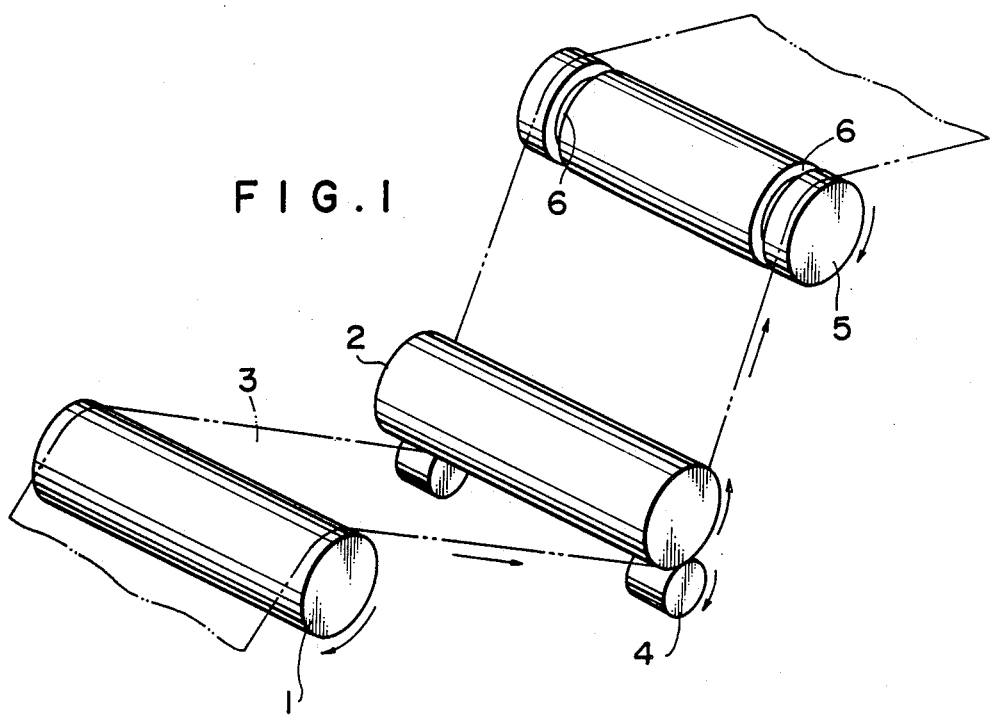
FIG. 1 is a perspective view indicating a drawing state of a film according to the method of the invention.

The engaging portions of the cooling roll are provided for engagement with both side ends or their vicinities of the film which are solidifying by cooling, and both sides of the film are fixed so as not to move in the cross direction by the engagement. Such engaging portions may be grooves, linear projections, irregularities, or the like formed on both ends or their vicinities of the cooling roll in the circumferential direction. The cross sections of the grooves or linear projections preferably have a good engaging ability with the film, and preferable cross sections are rectangular, triangular, or the like. When plural cooling rolls are incorporated into the drawing apparatus, the engaging portions are formed at least on the cooling roll where the contraction of the film is the greatest. The surface of the cooling roll preferably is provided with a hard chrome plating.

In the film drawing method of the invention, the drawn film is contacted in a softening state with the cooling roll, and pressed on the surface of the cooling roll by the tension of the film. Thus, both sides of the film are deformed according to the shape of the engaging portions during cooling, and prevent the contraction of the film in the cross direction by the engagement. Therefore, the generation of abrasion in the cross direction is avoided, and the occurrence of neck-in also is avoided.

EXAMPLES

Figure 2:
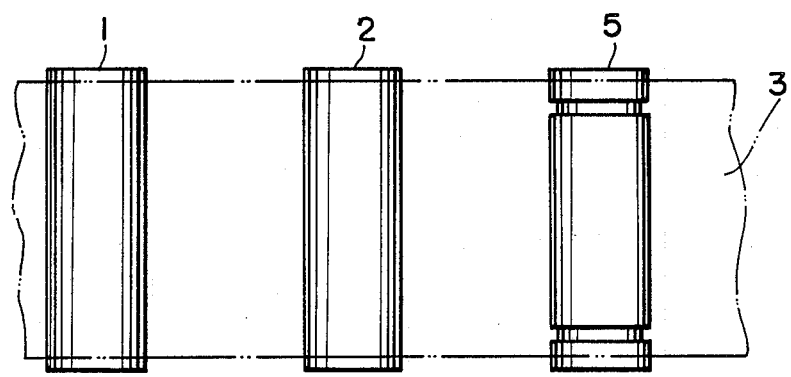
FIG. 2 is a plan view thereof.
Figure 3:
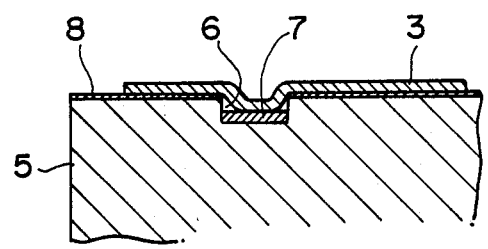
FIG. 3 is a partially sectional view of the cooling roll of FIG. 1.

A drawing state of a film according to the method of the invention is shown in FIG. 1 and FIG. 2. The film 3 travels through a drawing roll 1, a drawing cooling roll 2, and a cooling roll 5, successively. The drawing cooling roll 2 has both functions of a drawing roll and a cooling roll, and the drawing of the film 3 occurs between the drawing roll 1 and the drawing cooling roll 2. Both sides of the film 3 is nipped by nip rolls 4 so as to prevent the occurrence of neck-in. Each annular, engaging groove 6 is formed near both ends of the cooling roll 5 in the circumferential direction as the engaging portion of the film 3. As shown in FIG. 3, the engaging groove 6 has a rectangular cross section having a width of 5 mm and a depth of 1 mm. The bottom portion of the engaging groove is coated with an epoxy resin layer 7 for rustproofing. The surface of the cooling roll 5 is provided with a hard chrome plating layer 8.

When a film is drawn by the above apparatus, the drawing cooling roll 2 and the cooling roll 5 are rotated at the same circumferential speed, and their cooling mechanisms are rendered to work. The nip rolls 4 are rotated at the same circumferential speed as the drawing cooling roll 2, and the drawing roll 1 is rotated at a circumferential speed slower than the drawing cooling roll 2. In this state, when a film 3 is passed through respective rolls, the film 3 is drawn between the drawing roll 1 and the drawing cooling roll 2 in the longitudinal direction, and slightly cooled at the drawing cooling roll 2. The film 3 is cooled at the cooling roll 5, and gradually solidified. At that time, both sides of the film 3 are entered into the engaging groove 6 by the tension of the film, as shown in FIG. 3, and solidified in the engaging state with the engaging groove 6. Therefore, the contraction of the film 3 in the cross direction caused by the thermal shrinkage through cooling, by the strain due to the tension in the longitudinal direction, and the like is prevented by the engagement of both side portions with the engaging groove 6.

Figure 4:
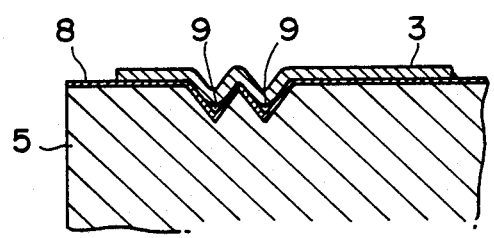
FIG. 4 is a partially sectional view of another cooling roll used for the method of the invention.

FIG. 4 indicates another example of the engaging portion which is composed of double triangle grooves 9 having a triangular cross section formed in the circumferential direction in series. The film 3 is engaged more securely with the engaging portion of the cooling roll by forming two or more engaging grooves in series.

The experimental results in the examples of the invention are shown in the following table together with conventional examples.

TABLE 1

|  | Cooling Roll | | |
| --- | --- | --- | --- |
|  | Groove | Surface Material | Abrasion |
| Conventional 1 | None | Ceramic | Occurred (Much) |
| Conventional 2 | None | Hard Chrome | Occurred (Little) Gradually Increased |
| Invention 1 | Present | Ceramic | None Gradually occurred |

TABLE 1-continued

|  | Cooling Roll | | |
| --- | --- | --- | --- |
|  | Groove | Surface Material | Abrasion |
| Invention 2 | Present | Hard Chrome | (Little) None Never occurred |

The above results indicate that, when a groove is formed on the cooling roll, abrasion does not occur.

We claim:

1. In a method of drawing a film which comprises drawing the traveling film in the longitudinal direction between rolls and thereafter cooling the drawn film by a cooling roll which is non-collinear with said rolls, wherein the improvement comprises frictionally engaging, without using nip rolls, both side ends of their vicinities of the film with engaging portions formed on both ends or their vicinities of the cooling roll in the circumferential direction.

2. The method of claim 1 wherein said engaging portions are grooves, linear projections or irregularities.

3. The method of claim 1 wherein said engaging portions are grooves or linear projections having a rectangular or triangular cross section.

4. The method of claim 1, wherein a surface of said cooling roll comprises hard chrome plating.

5. The method of claim 1, wherein said engaging portions are 5 mm wide and 1 mm deep.

6. The method of claim 1, wherein said engaging portions have a bottom portion coated with an epoxy resin layer.

7. The method of claim 1, wherein said rolls comprise a drawing cooling roll and a drawing roll.

8. The method of claim 7, wherein said drawing cooling roll and said drawing roll rotate at equal circumferential speeds.

9. The method of claim 7, wherein said drawing roll roates more slowly than said drawing cooling roll.

10. The method of claim 3, wherein a plurality of engaging portions are provided in series.

* * * * *